United States Patent [19]

Thomas

[11] 4,180,086

[45] Dec. 25, 1979

[54] HYPEREXTENDIBLE WALKER

[75] Inventor: Morton I. Thomas, Nyack, N.Y.

[73] Assignee: Temco Products, Inc., Passaic, N.J.

[21] Appl. No.: 938,706

[22] Filed: Aug. 31, 1978

[51] Int. Cl.[2] .............................................. F16M 13/08

[52] U.S. Cl. .......................................... 135/67; 135/74

[58] Field of Search ............... 135/67, 65, 74, DIG. 9; 292/265, 263; 211/132; 248/166, 167; 403/350

[56] References Cited

U.S. PATENT DOCUMENTS

| | | | |
|---|---|---|---|
| 598,405 | 2/1898 | Williams | 135/65 |
| 2,796,916 | 6/1957 | Womble | 135/67 |
| 3,516,425 | 6/1970 | Rigal | 135/67 |
| 3,658,079 | 4/1972 | Block | 135/67 |
| 3,993,088 | 11/1976 | Thomas | 135/67 |
| 4,056,115 | 11/1977 | Thomas | 135/67 |

*Primary Examiner*—Reinaldo P. Machado

*Attorney, Agent, or Firm*—Richard C. Woodbridge

[57] ABSTRACT

An invalid walker includes a means for locking at least one of the side frames in a hyperextended position. The walker includes a pair of U-shaped side frames whose front legs are connected by a cross brace member. Each of the rear legs of the side frames is connected to the cross brace member by a telescoping tubular device in which a first tube telescopes into and is received by a second tube. A pushbutton mechanism is housed inside the first tube and positioned within a first aperture in the first tube. The second tube includes a pair of locking apertures, one for locking the side frame in a first normal open position and the second for locking the side frame in a hyperextended position. The apparatus further includes a foot adjustment means for levelling the rubber foot of the hyperextended rear leg of the hyperextended side frame with the feet of the other three legs of the apparatus.

10 Claims, 9 Drawing Figures

Fig. 5.
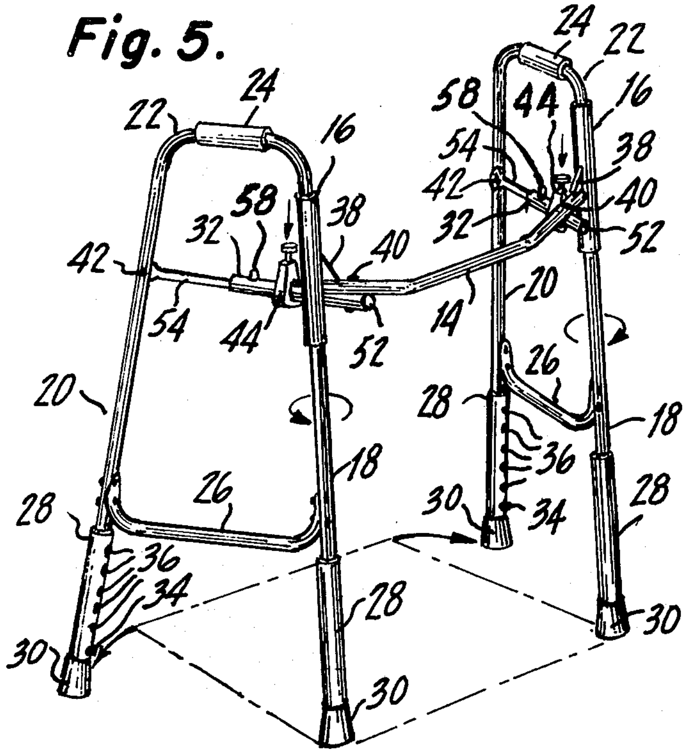
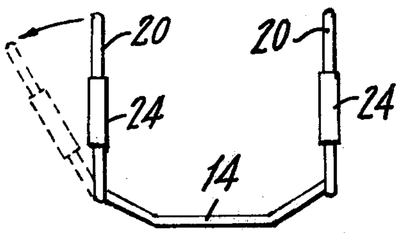
Fig. 6.
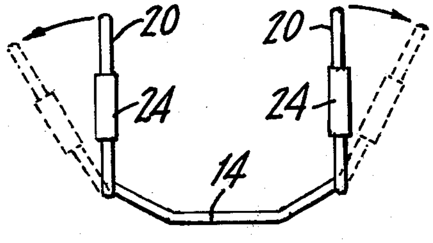
Fig. 7.
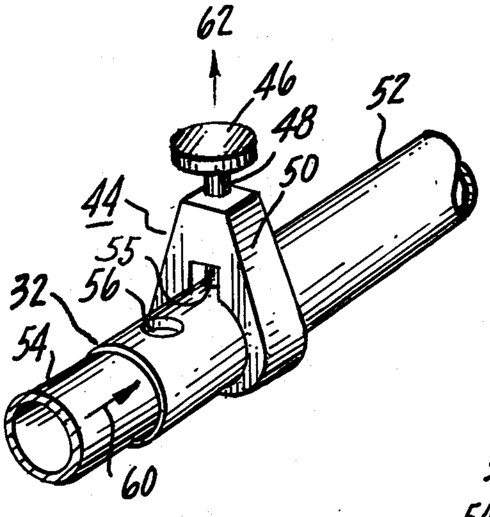
Fig. 8.
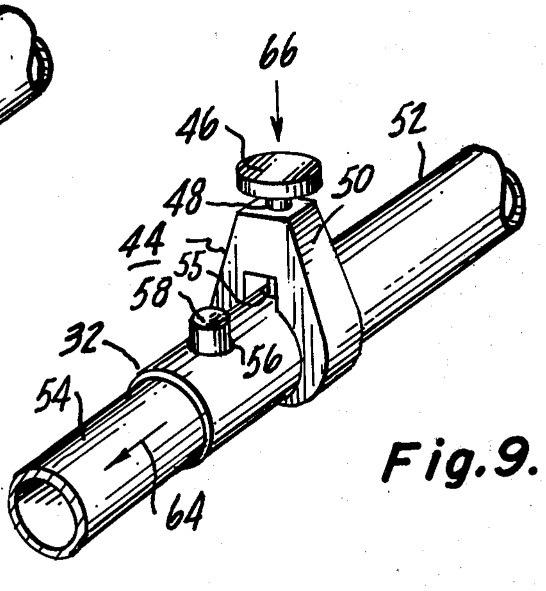
Fig. 9.

HYPEREXTENDIBLE WALKER

BACKGROUND OF THE INVENTION

1. Field of the Invention

This invention relates to an invalid walker including means for locking at least one of the side frames in a hyperextended position.

2. Description of the Prior Art

Folding and non-folding invalid walkers are well known to those of ordinary skill in the art. An example of a typical rigid non-folding walker can be found in U.S. Design Pat. No. 234,165. An example of a prior art folding walker may be found in the disclosure of U.S. Pat. No. 3,783,886 invented by the inventor of the apparatus disclosed herein. The present inventor is also the co-inventor along with Donald W. Edwards of a "Foldable Swingable Walker" disclosed in U.S. Pat. No. 3,442,276. Other possibly relevant prior art devices are disclosed from the following U.S. Pat. Nos. 935,885; 2,397,382; 2,667,914; 2,960,148; 3,442,276; 3,658,079; 3,688,789; 3,783,886; 3,833,012 and 3,851,846.

On Nov. 23, 1976, U.S. Pat. No. 3,993,008 was issued to the present inventor, Morton I. Thomas, for a "Folding Walker". In general the device was well received by the trade. It is similar to the present invention in the limited respect that a pair of U-shaped side frames are connected together by a rotatable cross brace and the device may be locked in a normal open position by a pair of telescoping members connecting the U-shaped side frames to the cross brace member.

It was eventually discovered that the walker such as described in U.S. Pat. No. 3,993,088 was being extended beyond its normal open position for use in a variety of special circumstances. Investigation indicated that there is a need for a dependable safe invalid walker that can be converted either unilaterally or bi-laterally into a hyperextended walker. There is known to be a need for a dependable hyperextendible walker under the following conditions. Firstly, patients are frequently put in full body casts, sometimes known as body spicas, wherein the leg is positioned at an angle of approximately 45° with respect to the rest of the body. Under those circumstances a normal walker interferes with the location of the leg. Secondly, patients who have experienced a full hip replacement will frequently have their legs set out at an angle as much as 45° while the joint is allowed to mend. Thirdly, children who have what is known as Legg-Perthes disease are often placed in casts which extend both legs at an angle of 45°. Fourthly, it is often difficult for a person to get out of a chair into a normally opened walker because the rear legs of the normally opened walker butt up against the front of the chair. A hyperextended walker would be easier to get into because it is possible to bring the front cross brace and the side grips closer to the individual trying to stand up.

Insofar as is known, there are no specifically bimodal hyperextendible invalid walkers available to the general public. It is possible to mis-use the walker disclosed in U.S. Pat. No. 3,993,088 in the hyperextended position. However, that walker when used in the hyperextended position will not remain in that position. Additionally, when only one side frame is forced into a hyperextended position, the rear foot of that side frame will generally not lie in the same plane as the other three feet of the walker. It was in the context of the foregoing prior art that the present invention arose.

SUMMARY OF THE INVENTION

Briefly described the invention comprises a bimodal hyperextendible walker which may be employed in a normal open mode or with one or both of the side frames locked in a hyperextended position. A first and a second U-shaped side frame are connected together by a cross brace. The front legs of each of the side frames passes through a sleeve welded to the cross brace in such a fashion that the side frames may be folded into the cross brace for storage of the apparatus. The rear legs of each of the side frames are connected to the cross brace by a lockable telescoping member. The telescoping member comprises a first smaller tube riveted to the rear leg and a second larger tube pivotally pinned to the cross brace and adapted to receive the smaller first tube in a telescoping manner. The smaller inner tube includes a first aperture therein and a spring loaded pushbutton therein which is adapted to bias the pushbutton into the aperture. The second tube includes a first and a second aperture therein adapted to receive the spring loaded pushbutton from the first tube. When the pushbutton is received in the first aperture of the second tube the device is biased in the normal open conventional position. However, the side frame may be extended to a locked hyperextended position by depressing the pushbutton and engaging the pushbutton in the second locking aperture. For convenience and safety considerations a palm pushable plunger device may be attached to the second tube and located over the first aperture so as to make it easier to disengage the pushbutton from the normal position and move it to the hyperextended position.

The four legs of the walker are also equipped with feet which can adjust the height of the walker. When one side frame is placed in the hyperextended position and the other side frame remains in the normal position, the rear leg of the hyperextended frame rises above the plane of the other three feet of the walker. Accordingly, the present invention includes a means for extending the rear leg of the hyperextended side frame to a certain predetermined position so that all four feet of the walker lie in the same plane when the device is used with one of the side frames in the hyperextended mode.

These and other features of the present invention will be more fully understood with reference to the following drawings and the detailed description of the invention.

BRIEF DESCRIPTION OF THE DRAWINGS

FIG. 5 shows the present invention with both sides in the hyperextended mode.

FIG. 6 is a top plan view of the device illustrated in FIG. 4 with one side in the hyperextended mode.

FIG. 7 is a top plan view of the device illustrated in FIG. 5 with both sides in the hyperextended mode.

FIG. 8 is a detailed view showing the tubular locking means in the normal open locked mode.

FIG. 9 illustrates the tubular locking means with the device locked in the hyperextended mode.

DETAILED DESCRIPTION OF THE INVENTION

During the course of this description like numbers will be used to indicate like elements according to the different views of the invention.

Figure 1:
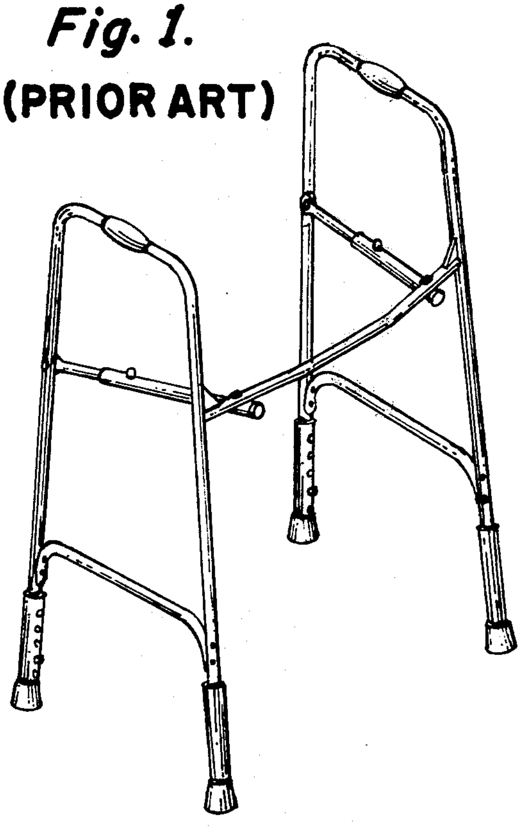
Fig. 1. (PRIOR ART)
FIG. 1 illustrates a prior art folding walker.

The prior art walker disclosed in U.S. Pat. No. 3,993,088 is illustrated and labeled as "prior art" in FIG. 1. That device may be forced into a hyperextended mode but cannot be locked in the hyperextendable mode. In addition, if only one side frame is forced into the hyperextended mode the rear foot of that side frame will rise above the plane of the other three feet thereby causing the structure to become unstable.

Figure 2:
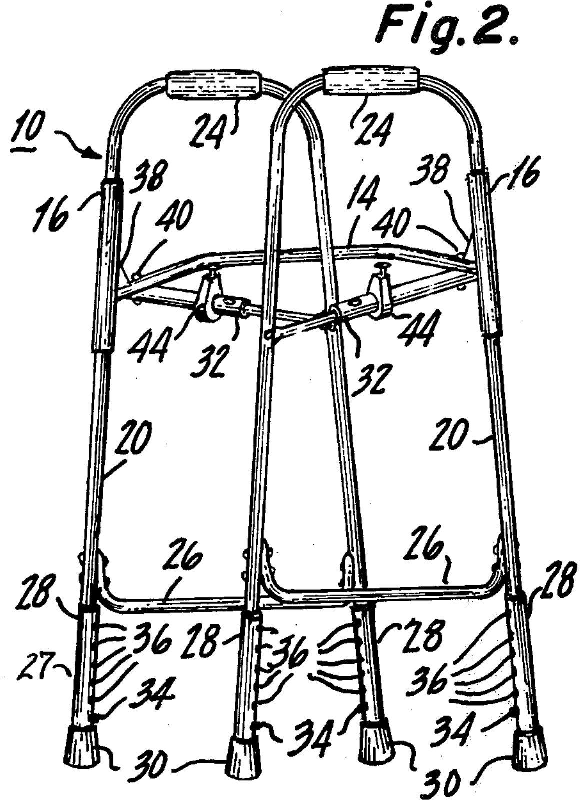
FIG. 2 illustrates the walker of the present invention as shown in the folded or storage mode.

The walker 10 of the present invention is shown in its folded state in FIG. 2. One of the major advantages of the present invention is that it may be folded into a relatively compact size so that it may be transported and stored with ease.

Figure 3:
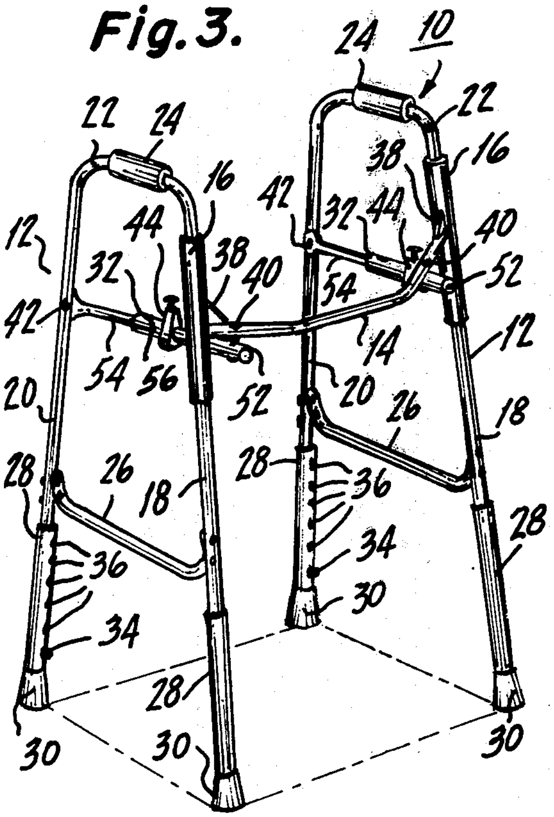
FIG. 3 illustrates the walker of the present invention in the normal open mode.

FIG. 3 illustrates the present invention 10 in the normal open mode. The apparatus 10 includes a pair of U-shaped side frames 12 each including a front leg 18 and a rear leg 20. The front legs 18 are connected together by a cross brace member 14. Cross brace member 14 includes a pair of hollow sleeves 16 which are rotatably received around front legs 18. A pair of gussets 38 are welded between the sleeve 16 and the cross brace bar so as to reinforce the member. The side frames 12 are free to rotate within sleeve 16 limited only by the position of the telescoping locking means 44.

The front legs 18 and the rear legs 20 of the U-shaped side frames 12 are connected together by an upper section 22. A pair of rubber-like hand grips 24 surround section 22 and provide a location for the user to obtain a purchase on the apparatus. According to the preferred embodiment the front and rear legs are further reinforced by a lower metal brace member 26 which is riveted between the front leg 18 and the rear leg 20 of each of the U-shaped side frames 12. It is also possible that an additional brace, not shown, could be employed between the front legs 18 and the rear legs 12 if further rigidity were required.

Each of the front legs 18 and the back legs 20 is equipped with a leg length adjustment means 27. The leg length adjuster 27 comprises a hollow sleeve 28 which slidably receives the leg tubing and a rubberized foot 30 which is firmly attached to the sleeve 28 and adapted to make solid frictional contact with the floor. A grommet at the end of the sleeve removed from the foot is employed to stabilize the leg length adjuster and to provide additional noise suppression. The sleeve 28 includes a plurality of leg height adjustment holes 36 which are adapted to receive and lock a spring loaded pushbutton 34 in a particular position. The spring loaded pushbutton mechanism is located within the tubing of the front leg 18 or the rear leg 20 and is substantially the same as that described in U.S. Pat. No. 3,442,276. This particular type of pushbutton mechanism is conventional in the industry and need not be further described. The pushbutton 34 of the pushbutton mechanism sits in an aperture, not shown, inside the tubing of the front leg 18 or the rear leg 20 and may be positioned in any one of the apertures 36 of the sleeve 28 by depressing the pushbutton 34 and manually positioning it into any one of the appropriate locking apertures. The locking apertures 36 are spaced approximately 1" apart. According to the preferred embodiment of the present invention 10 the rear leg 20 of one of the U-shaped side frames 12 will rise approximately 1" when the corresponding side frame is placed in the hyperextended position and locked therein by the tubular locking means 32 in a manner to be described later. Accordingly, the spacing of the holes on the leg length adjusting means is important so that the hyperextended rear leg 20 may be dropped 1" so that the four rubber feet of the apparatus all will end in substantially the same plane.

The apparatus 10 is locked in the normal open position or in the hyperextended position by the tubular telescoping locking means 32. There are two telescoping locking means 32 associated with the invention. One connects the rear leg 12 of one side frame to the cross brace 14. The other connects the other rear leg 20 of the other, or second, U-shaped side frame to the cross brace 14. Each telescoping locking means 32 includes a first tube 54 connected to the rear leg 20 by a rivet. The first tube 54 telescopes into and is received by a second outer tube 52 which in turn is connected to cross brace 14 by a pin 40. The telescoping tubular locking means 32 rotates about pin 40 as it goes from the folded to the normal and eventually to the hyperextended position. The inner tube 54 encloses a spring loaded pushbutton mechanism similar to that employed in the adjustable legs of the apparatus. A description of the mechanism of a suitable pushbutton can be found in the disclosure of U.S. Pat. No. 3,442,276 issued to the present inventor, Morton I. Thomas. The first tube 54 includes an aperture which guides and contains the head of the pushbutton. The second tube includes a first aperture 55 and second aperture 56 which are adapted to receive and lock pushbutton 58. When pushbutton 58 is received in the first aperture 55 of the second tube 52 it is locked in the normal open position as illustrated in FIG. 3. When the button is depressed the tubes may be moved with respect to one another so that the button 58 may be received in the second aperture 56 of the second tube 52 thereby locking the associated side frame in the hyperextended position.

A palm pusher device 44 for operating the pushbutton 58 is attached to the second tube 52 and located directly above the normal open first locking aperture 55 therein. The palm pusher 44 is very similar to that described in U.S. Pat. No. 4,056,115 issued to the present inventor, Morton I. Thomas. It is especially useful for individuals with arthritis or other manual handicaps, however, it is generally not considered to be desirable to have two palm pushers 44 on the same telescoping locking means, i.e. one over the normal open aperture 55 and one other the hyperextended aperture 56. The reason is that the palm pusher 44 obscures the view of the pushbutton 58 and makes it unclear whether or not the device is locked in the correct state.

The apparatus may be operated in the following manner. For storage, the pushbutton 58 of the two telescoping locking means 32 are disengaged from the normal open 55 or hyperextended locking 56 apertures and the two side frames 12 are folded in towards the cross brace 14 until they assume the shape illustrated in FIG. 2. This allows the device to be readily stored or shipped.

To open the device to the normal open position, as illustrated in FIG. 3, the two side frames are moved outwardly until they automatically lock in the normal open position. This will occur because the pushbutton 58 will arrive at the normal locking aperture 55 first and automatically engage in it.

Figure 4:
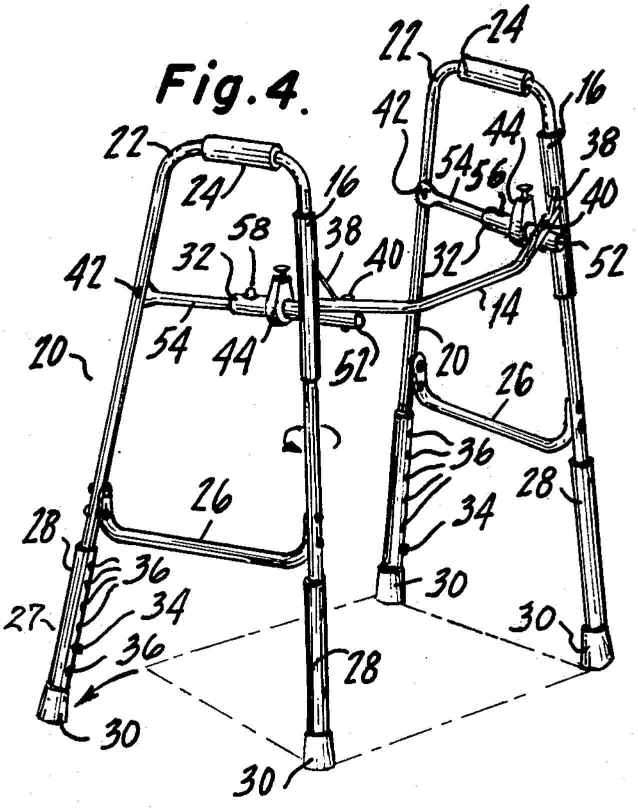
FIG. 4 shows the walker of the present invention with one side in the hyperextended mode.

If the user desires to extend only one side to the hyperextended position, he merely depresses the palm pusher button 46 and applies force to rotate the associated side frame 12 into a more open position as shown in FIGS. 4 and 6. The pushbutton 58 will automatically pop into the hyperextended locking hole 56 and hold the side frame 12 in that position until released. When only one side frame 12 is hyperextended it is necessary to extend the corresponding rear leg 20 downwardly so that it meets the plane of the remaining three legs of the walker. According to the preferred embodiment of the invention 10 the foot 30 of the hyperextended rear leg is dropped 1" by the leg lengthening means in order to make it fall in the same plane with the other three feet 30 of the walker. Accordingly, the distance between length adjusting apertures on the feet is approximately 1". The distance between centers of the locking apertures 55 and 56 on the telescoping tubular locking means 32 is approximately 1" which causes exactly a 1" rise in the hyperextended rear leg. In the normal mode the angle between the side frame and the cross bar is approximately 100 degrees. In the hyperextended mode the angle between the same side frame and the cross bar is approximately 135 degrees.

It may also be desirable to place both sides 12 in the hyperextended position. That is simply accomplished by performing the hyperextending operation on both sides 12 in the manner previously described. When both sides 12 are in the hyperextended mode as shown in FIGS. 5 and 7 it is not necessary to drop both rear feet 30 because both rear feet 30 rise the same amount, i.e. 1", and therefore the rear feet 30 will automatically fall into the same plane as the front feet 30. The only difference is that the device may tilt backwards a little bit if the rear legs aren't adjusted.

The apparatus can be easily folded to the storage position shown in FIG. 2 from the double hyperextended position illustrated in FIGS. 5 and 7 by depressing both pushbuttons 58 and folding the side frame inward, making sure that the pushbutton 58 doesn't engage in the normal mode aperture 55 while doing so, until it assumes the full folded state.

The device just described is relatively safe and easy to use even for individuals who suffer from severe manual impairment.

While the invention has been described with reference to a preferred embodiment thereof, it will be appreciated by those of ordinary skill in the art that various different modifications may be made to the elements of the device without departing from the spirit and scope of the invention.

I claim:

1. A hyperextendible walker apparatus comprising:
- a first U-shaped side frame including a first front leg and a first rear leg;
- a second U-shaped side frame including a second front leg and a second rear leg;
- a crossed brace means for connecting said first and second U-shaped side frames together, said cross brace means being rotatably connected to said first and second front legs respectively;
- a pair of normal open position locking means connected to said cross brace means and to said first and second U-shaped side frames respectively for locking said side frames in a normal open first position with respect to said cross brace means; and,
- a hyperextendible locking means forming part of said normal position locking means for locking at least one of said side frames in a hyperextended second position which position is extended at least 10° more open than the same side frame when in the normal open first position.

2. The apparatus of claim 1 further including:
- adjustable foot means connected to at least one of said rear legs; and,
- adjustment means on said adjustable foot means for extending and locking the adjustable foot means a predetermined amount so that the adjusted foot lies in the same plane as the other three feet of said walker apparatus.

3. The apparatus of claim 2 wherein said normal open position locking means includes:
- a telescoping tube means including a first tube which is received by and telescopes into a second tube, said telescoping tube means being connected at one end to a rear leg and at the other end to said cross brace means, said first tube and said second tube each including a first aperture therein.

4. The apparatus of claim 3 further including:
- a pushbutton means housed within said telescoping tube means which includes a pushbutton which is adapted to be received in said first aperture of said first and second tube when the associated side frame is in said normal open position.

5. The apparatus of claim 4 wherein said hyperextendible locking means comprises: a second aperture in said second tube which is adapted to receive said pushbutton when the side frame associated with that telescoping tube means is in the hyperextended position.

6. The apparatus of claim 5 further including:
- a palm operatable means attached to said second tube for depressing said pushbutton when said telescoping tube means is locked in the normal open position.

7. The apparatus of claim 6 wherein said adjustable foot means comprises:
- a sleeve means which is adapted to telescope over and to receive said walker legs;
- a pushbutton means housed within said adjustable foot means;
- a rubber shoe means attached to said sleeve means for making frictional contact with the floor,
- wherein said sleeve means includes a plurality of locking apertures therein for locking said adjustable foot means in a position such that the shoe means on all of the legs of the walker will always lie in the same plane regardless of the locked position of the apparatus.

8. The apparatus of claim 7 wherein the distance between the locking apertures on said adjustable foot means is approximately 1".

9. The apparatus of claim 8 wherein said apparatus includes two hyperextendible locking means, one for locking the first U-shaped side frame in a hyperextended position and the other for locking the second U-shaped side frame in a hyperextended position.

10. The apparatus of claim 9 wherein said apparatus includes:
- four adjustable foot means each attached to one of the four legs respectively;
- a pair of hand grip means each respectively connected to said first and second U-shaped side frames in order to provide a grip thereon; and,
- a pair of side frame brace means including a first side frame brace and a second side frame brace, said first side frame brace being connected between said first rear leg and said first front leg, said second side frame brace being connected between said second rear leg and said second front leg.

* * * * *